United States Patent [19]

Chujko

[11] Patent Number: 5,027,259

[45] Date of Patent: Jun. 25, 1991

[54] FLEXIBLE LIGHT PIPE WITH IMPROVED PERFORMANCE COATING

[76] Inventor: Daniel A. Chujko, 295 Silver La., McKees Rocks, Pa. 15136

[21] Appl. No.: 488,686

[22] Filed: Mar. 5, 1990

[51] Int. Cl.⁵ .............................................. F21V 8/00
[52] U.S. Cl. ........................................... 362/32; 362/26
[58] Field of Search ...................... 362/23, 26, 31, 32, 362/34, 84

[56] References Cited

U.S. PATENT DOCUMENTS

| | | | |
|---|---|---|---|
| 3,208,174 | 9/1965 | Wienshell | 362/32 |
| 3,497,981 | 3/1970 | Tyne | 362/32 |
| 3,602,759 | 8/1971 | Evana | 313/112 |
| 3,641,332 | 2/1972 | Reick et al. | 362/32 |
| 4,104,708 | 8/1978 | Bohli | 362/34 |
| 4,936,663 | 6/1990 | Mori | 362/32 |
| 4,957,347 | 9/1990 | Barian | 350/96.32 |

OTHER PUBLICATIONS

Roo International Publication–undated.
Zeus Technical Data (Heat Shrink Teflon) undated (10 pages).

Primary Examiner—Ira S. Lazarus
Assistant Examiner—Sue Hagarman
Attorney, Agent, or Firm—W. D. Palmer

[57] ABSTRACT

Flexible elongated light conductor comprises elongated transparent plastic member which carries a protective overcoat of shrink-fitted light-transmitting material. The light conductor can be conformed into letters or indicia and when end lighted, generally resembles a neon sign. The snugly fitting overcoat improves the light-emitting performance of the light conductor and enables the conductor to be bent through relatively small radii turns to form letters, etc. without distorting the overcoat, which distortions if present, would introduce objectionable variations in appearance.

7 Claims, 1 Drawing Sheet

FLEXIBLE LIGHT PIPE WITH IMPROVED PERFORMANCE COATING

BACKGROUND OF THE INVENTION

This invention relates to flexible light pipes which are coated for improved performance and environmental protection and, more particularly, to improved flexible light pipes having improved light output and which can be bent through relatively sharp angles without distorting the protective coating.

Flexible light pipes are well known and one modification of such pipes is described in U.S. Pat. No. 3,641,332 dated Feb. 8, 1972 to Reick et al. This pipe utilized a polymethyl-methacrylate core with a "Teflon" resin protective overcoat spaced from the core.

Light pipes for decorative applications are described in a brochure originated by Roo International of Australia. Such pipes carry a protective overcoat which tends to cause uneven light patterns, especially when the flexible pipe is bent through relatively small angles. This type of pipe can be used conformed into letters, etc. to provide the effect of a neon sign.

Shrink-fit plastics are well known and are used for a variety of applications, one of which is for the protection of fluorescent lamps as described in U.S. Pat. No. 3,602,759 dated Aug. 31, 1971 to Evans. These shrink-fit lamp overcoatings can also be used as a filter, a light-polarizing component, or an encasement for a reflector.

SUMMARY OF THE INVENTION

There is provided a flexible light conductor which can be bent into predetermined configurations and which is adapted to be end lighted in order to provide a variety of different lighting shapes. The light conductor comprises an elongated transparent plastic member having a predetermined configuration of predetermined dimensions as desired for the shapes to be produced and the plastic member is sufficiently flexible to be conformed into the shapes desired. At least one end of the plastic member is adapted to be retained in light-receptive relationship with respect to a light source to direct received light throughout the length of the plastic member. The plastic member is provided with a thin flexible snugly overfitting coating which improves performance and also is resistant to the deleterious effects of the environment in which the shaped light conductor is to be utilized.

The overfitting coating prior to application has the characteristic of shrinking in diameter when heated under predetermined conditions. This coating is fitted or applied over the circular core member and is then heated to a predetermined temperature and for a predetermined time to shrink fit the protective coating onto the member to be protected. The resulting protective coating very snugly overfits the core member and the light conductor can be readily bent into its desired shapes without encountering any significant separation between the core and the coating.

BRIEF DESCRIPTION OF THE DRAWINGS

For a better understanding of the invention, reference should be made to the accompanying drawings wherein.

DESCRIPTION OF THE PREFERRED EMBODIMENTS

Figure 1:
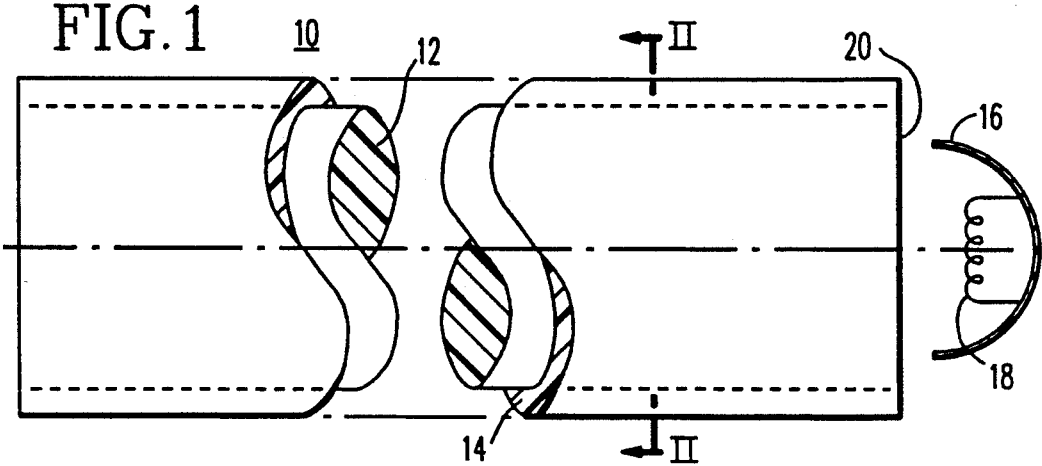
FIG. 1 is an elevational view, shown partly in section, of the present light conductor with one end thereof positioned to receive the light from a reflector-type lamp.
Figure 2:
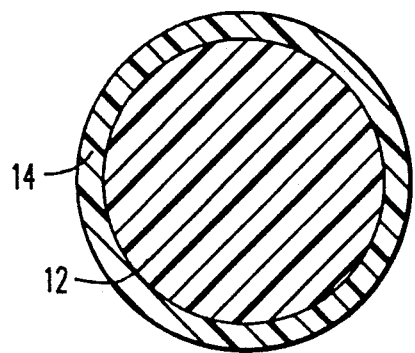
FIG. 2 is a section of the conductor as shown in FIG. 1.

The present flexible elongated light conductor 10 is shown in straight fashion in FIGS. 1 and 2 and comprises an elongated plastic core member 12 having a circular cross-sectional configuration of predetermined dimensions as desired for the lighting shapes to be produced. For forming letters similar to a neon-type sign, a one-half inch diameter (1.3 cm) core member has been found to be very suitable and such a member can be bent to a radius as small as one and one-half inches (3.8 cm) without impairing the light-conducting properties of the composite conductor 10.

The core member 12 is preferably fabricated of flexible polymethylmethacrylate as this material is very transparent. Also, when shielded from ultraviolet radiations, the transparency is maintained over very extended periods of time. A thin flexible light-transmitting coating 14 of shrink-fit plastic is carried over and snugly overfits the core member 12. The coating 14 is selected to be resistant to the deleterious effects of the environment in which the light conductor is intended to be utilized. It should also be resistant to scuffing and abrasion and should withstand any washing as used to remove dirt and grease. A preferred material is shrink-fit "Teflon" resin, although other suitable shrink fit materials may be substituted therefor. As a specific example, the overfitting coating 14 has a thickness of about 20 mils (0.5 mm) and this thickness can be varied.

The coating 14 had the characteristic of shrinking in diameter upon being heated under predetermined conditions. To apply the coating 14, a hose or sleeve of protective plastic is slipped over the core 12 and the composite is heated to a temperature of several hundred degrees F to shrink the coating 14 onto the core 12. As a specific example, the sleeve-fitted core is pulled through a heating zone maintained at a temperature of 400° F. with the time in the heating zone being from 10 to 30 seconds, taking care not to damage the core material 12.

Best results have been achieved with heat shrink "Teflon" resin tubing marketed by Zeus Industrial Products, Inc. now located in Orangeburg, SC and the preferred material is designated as FEP (Fluorinated Ethylene-propylene) "Teflon" resin which has a 1.3 to 1 shrink ratio. Other heat shrink materials can be substituted therefor.

The core 12 can be readily fabricated in various diameters and different shapes as desired. As an example, the core 12 can have a square or rectangular cross section, although a circular cross section is preferred. The core material can be cast into its final form or otherwise fabricated into the elongated configurations needed for the present applications.

The light conductor 10 is energized by a light-source means 16 which preferably takes the form of a reflector-type lamp which can incorporate a quartz-halogen incandescent source 18, shown diagrammatically. The output of the lamp 16 is focussed on the end 20 of the light conductor 10 and the light is transmitted throughout the length of the conductor 10 by well-known optical principles. For a one-half inch diameter (1.3 cm) conduit 12, a practical length limit for the conductor 10 is about 70 feet (21 meters). If a light source is used at both ends, the conductor length can be doubled. The lamp 16 can be provided with a lens cover which can be clear or can comprise a colored filter. Alternatively, the lens cover can comprises a series of adjacent differently colored filters with the cover being rotatable manually or electrically about its center point to provide changing colors for the light pipe 10. Such a lamp modification is known in the art.

Figure 3:
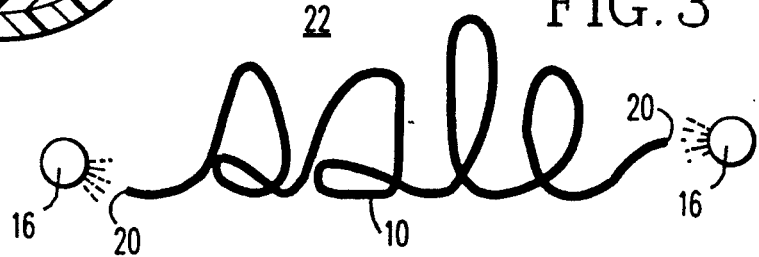
FIG. 3 is an elevational view of a sign constructed from the present light conductor with energizing light sources shown in diagrammatic form at both ends of the light conductor.

In FIG. 3 is shown a length of light conductor conformed as a sign 22 similar to a neon-type sign. As is conventional, the sign 22 comprises different letters or indicia. In fabricating the sign, when working with 0.5 inch diameter (1.3 cm) core material 12, it is desirable to limit the bends in the letters to a radius of not less than about 1.5 inch (3.8 cm). This insures that the critical angle is not exceeded which would cause light to be lost from the pipe or conduit. With such a radius and with this size of light conductor, there is substantially no separation between the overfitting coating 14 and the core material 12. Any separation of the coating 14 and the core material 12, particularly as might be encountered at the bends, will provide areas of uneven illumination which will impair the appearance of the sign. Unwanted spaces between the formed letters can be painted black or otherwise shielded. For this application, a reflector lamp 16 is provided to illuminate both ends 20 of the light conductor 10 which comprises the sign.

When the sign shown in FIG. 3 is operated, it provides the effect of a neon sign. The present sign has several advantages over the neon sign as the colors in which the sign is displayed can be readily changed by placing filters over the light source 16. Alternatively, and as known in the art, the light source 16 can be provided with changing filters so that the emitted colors can be rapidly changed from red to green to blue, for example. This is very effective from an advertising point of view and such effects cannot be effectively achieved with a neon or any other type of lighted sign.

The use of the shrink fit plastic overcoating has other advantages. The close very snug fit between the core material 12 and the overcoat 14 serves to minimize any residual spacing which might otherwise occur between these elements. Such residual spacing provides additional interface reflections with the light loss attendant therewith. In a series of optical measurements, the present light conductor had a side-measured brightness about 30% greater than similar light conductors which used protective overcoats which were not of the shrink-fit variety. This brightness increase apparently is attributable to the fact that interface reflections within the light conductor are minimized.

Another advantage of the heat-shrink overcoat 14 is that damage to the light pipe 10 can readily be repaired by simply cutting out a section of the core material 12 and the overcoat 14, slipping the hose or sleeve of heat-shrinkable overcoating over the remaining light pipe section, gluing together the ends of the core material 12 and shrink-fitting the overlying sleeve material onto the core 12. Still another advantage of the heat-shrink coating is that the light pipe 10 can be used in underwater applications and there is no tendency for condensation to form between the overcoat 14 and the core 12.

Figure 4:
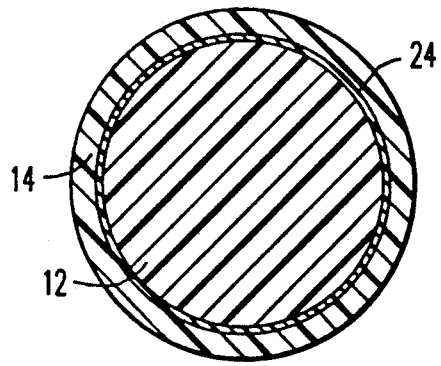
FIG. 4 is a section of an alternative embodiment wherein a sleeve of colored filter or refracting material is included between the core member and the shrink fit plastic overcoat.

In the alternative embodiment shown in FIG. 4, an additional layer or sleeve 24 of light-modifying colored plastic or refracting material is included over the plastic core member 12 with the shrink fit coating 14 snugly fitting over the combined coatings. In this manner, the composite light conductor can be provided with any predetermined desired coloring and this can readily be varied within one sign. For example, in the embodiment as shown in FIG. 3, each of the indicia or letters which comprise the sign can be of a different color, if desired.

Figure 5:
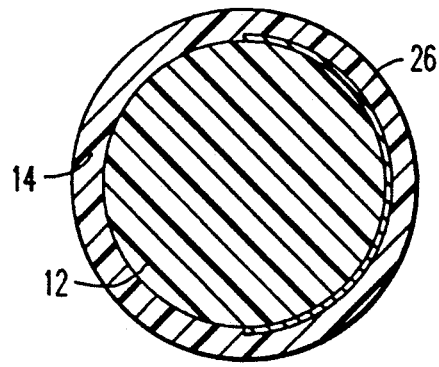
FIG. 5 is a section of another alternative embodiment wherein a reflector of hemicylindrical configuration is positioned next to the core member and the shrink-fit plastic overcoat snugly retains all components.

Another alternative embodiment is shown in FIG. 5 wherein a reflector member 26 formed as a hemicylinder is carried over the core member 12 and the shrink-fit plastic coating 14 snugly locks the composite structure together. Alternatively, other light-modifying materials could be substituted for the added members 24 or 26 as shown in FIGS. 4 and 5, examples being fluorescent plastics or polarizing sheets.

While a lettered sign is shown in FIG. 3, the present light pipe can be used for forming logos, outlines, for architectural lighting applications, or for other lighted indicia. It can also be used for illumination in hazardous areas.

I claim as my invention:

1. A flexible elongated light conductor which can be bent into predetermined configurations and which is adapted to be end lighted in order to provide a variety of different light-emitting shapes, said flexible light conductor comprising:

an elongated transparent plastic member having a predetermined cross-sectional configuration of predetermined dimensions as desired for the lighted shapes to be produced, said elongated plastic member having sufficient flexibility that it can be readily conformed into the shapes desired, and at least one end portion of said elongated plastic member adapted to be retained in light-receptive relationship with light source means to direct light received from the light source means along the length of said elongated plastic member;

a thin flexible light-transmitting member snugly overfitting said elongated plastic member, said overfitting member formed of material which is resistant to deleterious effects of the environment in which said shaped end-lighted plastic member is intended to be utilized;

said thin overfitting member prior to application over said elongated plastic member having the characteristic of shrinking in diameter upon being heated under predetermined conditions, and said thin overfitting member after application over said elongated plastic member having been heated to a predetermined temperature and for a predetermined time sufficient to heat shrink said overfitting member onto said elongated plastic member; whereby interface reflections between said elongated plastic member and said overfitting member are minimized, and said flexible light conductor may be bent through small radii turns when conforming said flexible light conductor into different desired shapes without encountering appreciable separation between said elongated plastic member and said snugly overfitting member.

2. The flexible light conductor as specified in claim 1, wherein said elongated plastic member has a circular cross-sectional configuration.

3. The flexible light conductor as specified in claim 1, wherein said elongated plastic member is polymethylmethacrylate, and said snugly overfitting member is fluorinated ethylene-propylene.

4. The flexible light conductor as specified in claim 1, wherein a light-modifying sleeve is carried between said elongated plastic member and said snugly overfitting member.

5. The flexible light conductor as specified in claim 1, wherein light reflector means is carried on a portion of said elongated plastic member, and said snugly overfitting member snugly locks together the components comprising said light conductor.

6. The flexible light conductor as specified in claim 1, wherein said flexible light conductor is formed into the configuration of a sign comprising different indicia.

7. The flexible light conductor as specified in claim 1, wherein said flexible light conductor is formed into the configuration of a sign comprising different indicia, said sign is illuminated when energized by said light-source means, lightmodifying sleeves of different light-modifying characteristics are carried between different predetermined portions of said elongated plastic member and said snugly overfitting member, and the relative positioning of said different light-modifying sleeves are selected to provide different light-modifying characteristics for different indicia comprising said sign.

* * * * *